Patented Sept. 10, 1935

2,013,811

UNITED STATES PATENT OFFICE 2,013,811

HYDRATED LIME COMPOSITION

Ralph W. Smith, Ste. Genevieve, Mo., assignor to Peerless White Lime Company, St. Louis, Mo., a corporation of Missouri No Drawing. Application October 28, 1932, Serial No. 640,017

1 Claim. (Cl. 106—24)

My invention relates to an improved plastering material and the process of making the same, its object being to produce such a material which, although consisting chiefly of commercial hydrated lime (dry powder state), will have a "workability" much superior thereto. It will be understood that the term "workability" has reference chiefly to the factors of plasticity, adhesiveness to the surface to which it is applied, and ease of spreading.

While high calcium lime slaked in an excess of water to a wet putty, is sufficiently workable for use as the main ingredient of wall coatings, it is well known that most limes hydrated with just sufficient water to form a dry powder (the hydrated lime of commerce) is not suitable for use as a "finish" coat plaster on account of lack of proper plasticity and spreading characteristics. My invention is directed to overcoming this defect, thus rendering commercial hydrated lime available for the use referred to.

For the purposes of accuracy and convenience of description in the following specification and claim, the term "quick lime" refers to the mixture of oxides produced by the calcination of dolomite as well as of "lime stones" embodying greater percentages of calcium carbonate, and "high calcium lime" means quick lime produced from stone containing 90% or more of calcium carbonate. The product (a mixture of $Ca(OH)_2$ and $Mg(OH)_2$) is referred to as "lime hydrate". The term "lime carbonate" is used to designate either calcium carbonate or magnesium carbonate, or mixtures of these.

In accordance with my invention I prepare a lime carbonate precipitate, for example, by agitation of milk of lime ($Ca(OH)_2$ suspended in water) with carbon dioxide. While the precipitate thus formed is calcium carbonate, it will be understood that in a similar manner magnesium carbonate or a mixture of calcium and magnesium carbonates may be precipitated, depending upon the re-agents used, the essential feature of this example of my process being to form a carbonate precipitate in water.

The wet precipitate is then mixed with a suitable quantity of high calcium quick lime. The proportion of precipitated carbonate to the quick lime is not critical, it having been found that good results are obtained by using 10% to 25% of carbonate to 90% to 75% of quick lime. It is essential, however, that the water content of the wet precipitate be such as to completely hydrate the quick lime, account being taken of the fact that during hydration a considerable quantity of the water will be driven off by the heat generated by this reaction. The amount of water in the precipitate is preferably such that when the hydration is completed, the product will be a substantially dry powder, or contain so little excess water that it can be readily dried by any one of several known drying methods.

The product of the above described process is a hydrated lime composition which exhibits very satisfactory workability when used in a wall plaster, and in fact has working qualities even superior to those of lime slaked and used in a plaster mixture before drying.

While I do not desire to be bound by any theory, it is my opinion that the physical characteristics of the precipitated carbonates in the composition, and the fact that the precipitated carbonates constitute the carrier for the hydrating water, is responsible for the particular plasticity and spreading characteristics of the product. That the use of a precipitate is important, appears from the fact that the desired result is not obtained by mixing unprecipitated carbonates with quick lime and then stirring the mixture with water.

While I have described the use of lime carbonate precipitates, I do not consider that my invention, in its broadest aspect, is limited to the use of precipitates of this particular kind as a plasticizing agent and carrier of the hydrating water.

Having fully described my invention, what I claim as new and desire to secure by Letters Patent of the United States is:

The process of forming a hydrated lime composition for use as a plastering material which comprises forming a precipitate of calcium carbonate by introducing carbon dioxide into a solution of quick lime in water and mixing the wet calcium carbonate precipitate with a substantially larger volume of high calcium quick lime, the weight of the calcium carbonate used being not less than 10% or more than 25% of the weight of the quick lime, and the water content of the precipitate being only slightly in excess of the total of the amount evaporated by the reaction and the amount required to completely hydrate the lime.

RALPH W. SMITH.